United States Patent [19]
Doxon

[11] 3,954,127
[45] May 4, 1976

[54] FOLDABLE BUCKSAW

[76] Inventor: William E. Doxon, 1000 E. 14th St., Hutchinson, Kans. 67501

[22] Filed: Mar. 13, 1975

[21] Appl. No.: 558,007

[52] U.S. Cl............................................. 145/32 R
[51] Int. Cl.² ....................................... B27B 21/00
[58] Field of Search.............. 145/31 R, 32 R, 32 A, 145/32 B, 33 E

[56] References Cited
FOREIGN PATENTS OR APPLICATIONS

| 207,894 | 3/1909 | Germany............................ 145/32 R |
| 404,579 | 10/1909 | France................................ 145/32 R |
| 499,630 | 11/1919 | France................................ 145/32 R |
| 363,285 | 4/1906 | France................................ 145/32 R |
| 1,035,979 | 4/1953 | France................................ 145/32 R |
| 545,022 | 2/1932 | Germany............................ 145/32 R |

*Primary Examiner*—Al Lawrence Smith
*Assistant Examiner*—J. T. Zatarga
*Attorney, Agent, or Firm*—Edward L. Brown

[57] ABSTRACT

This saw, when folded, is a portable, compact package occupying a space no larger than the handles. These handles, which are pivotally connected to the saw blade, enclose the blade when folded to avoid personal injury in handling and to avoid damage to adjacent articles as well as to the blade itself. When folded, the strut and tension member are stowed within the hollow handles. When the handles are unfolded and the strut and tension members placed in working position between the handles, the frame is complete and becomes a bucksaw.

5 Claims, 6 Drawing Figures

FOLDABLE BUCKSAW

BACKGROUND OF THE INVENTION

This invention relates to an improved type of folding saw and more particularly a folding bucksaw whose handles when folded encase the blade and other parts. It is compact and lightweight enough to be conveniently carried in a hiker's backpack or wherever else portability is a factor such as in a survival kit.

There are folding saws in the prior art, some of which have three main members, the handle being the short side of the triangle and the blade being one of the long sides. These triangular folding saws restrict the diameter of firewood that can be sawed because the back, or third member of the frame, severely limits the useful stroke unless a saw blade is used that is too long to be conveniently portable. Therefore triangular framed folding saws are not suited to the objectives. Trapezoidal or rectangular frame folding saws are shown in U.S. Pat. Nos. 2,595,288 and 2,930,420. One problem with folding portable saws shown in these patents is that tension in the saw blade develops high bending moments in the folding joints connecting the back of the saw frame with the side members. The problem in such prior art is to obtain economically a strong joint while retaining the desired objective of light weight. This invention has no folding joints that are subjected to bending moment; the only bending moment being in the central portion of the handles which have the ability to resist bending. This results in a saw less than half the weight of folding saws in the prior art.

SUMMARY OF THE INVENTION

It is an object of this invention to cover the teeth of the saw blade while the saw is in its folded and portable condition so that the teeth will not harm persons nor adjacent articles, yet have a saw that is quickly convertible to its working condition.

It is another object of this invention to make a practical, portable saw capable of cutting firewood but compact and lightweight enough to be carried by a hiker.

This portable saw in its working condition has an H-shaped frame similar to the familiar bucksaw. The crossbar of the H is a strut capable of resisting end compression. It is placed between the end handles, spacing them apart. The saw blade, which is pivotally connected to the bottom of the handles, connects the bottom of the H and an adjustable tension member connects the top of the H. As this tension member is tensioned by the adjustment means, the handles pivot on the ends of the strut and tension the slender, flexible saw blade so that it becomes capable of cutting as it is moved back and forth by pushing and pulling on one or both of the handles. This foldable saw differs from the conventional bucksaw in that the handles when folded over the blade, encase the blade and also provide for the strut and the tension member to be housed within the folded handles. The handles are approximately one-half the length of the saw blade. The tension member with its adjustment device can also be used to hold the assembled package together in its folded condition. This package is compact, the length being about equal to the saw blade length and its cross section being equal to that of the handle.

DESCRIPTION OF THE PREFERRED EMBODIMENTS

Figure 1:
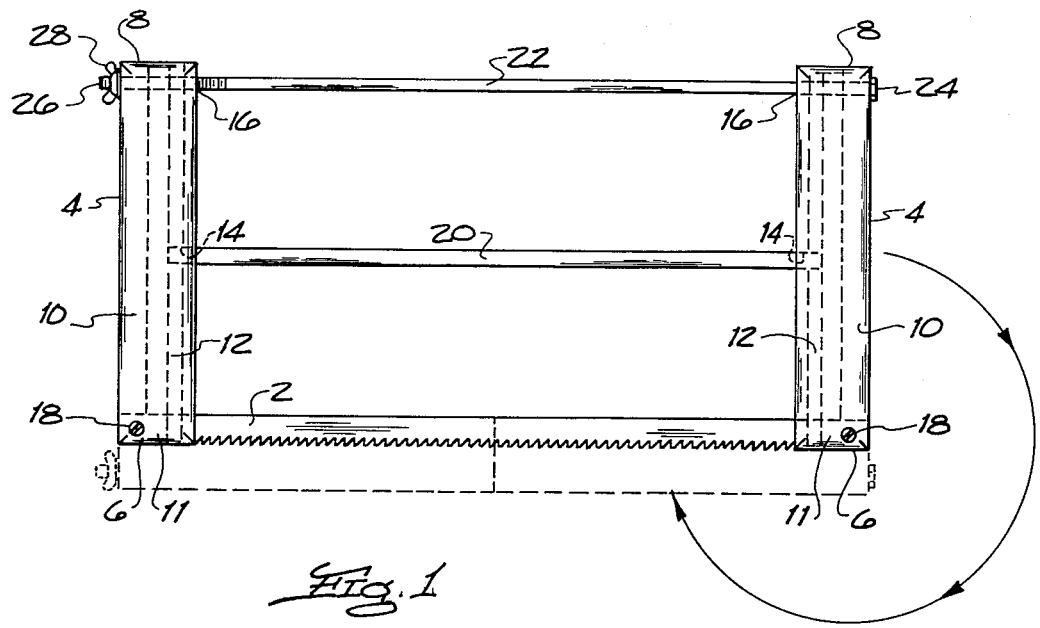
FIG. 1 is an elevational view of this invention in its working condition.

Referring to FIG. 1, which shows the bucksaw in its working condition, the saw blade 2 is pivotally fastened at each end to lower ends 6 of handles 4 with fasteners 18 to permit the saw blade 2 to be tensioned by drawing together the upper ends 8 of handles 4 with tension member 22 while strut 20, located between and parallel to saw blade 2 and tension member 22, spaces the handles 4 apart near their midpoint. End slot 11 in lower end 6 of handles 4 provides space for saw blade 2 while in working condition or while rotating handles 4 from working condition to folded condition and vice versa. A socket 14 for strut 20 is located on the inside edge and near the midpoint of each handle 4. Sockets 14 provide fulcrums for the ends of strut 20. A bore 16 through upper end 8 of each handle 4 provides a means for mounting tension member 22 to handles 4. Tension is applied to tension member 22, thence to saw blade 2, by tightening wing nut 28 onto threaded end 26 of tension member 22, whose other end has head 24, thus drawing together upper ends 8 of the handles 4. Handles 4 are about one-half as long as saw blade 2 and have a side slot or first hollow 10 along the outside edge of handle 4. When upper ends 8 of the handles 4 are disconnected by removing wing nut 28, they can be revolved 270°, first outwardly and then back inwardly, under saw blade 2 so that saw blade 2 is housed within first hollow 10 of the handles 4. In the folded position, shown in FIG. 2, handles 4 lie in an end-to-end relationship with their upper ends 8 adjacent to each other. Referring to both FIGS. 2 and 3, separate second hollows 12, running lengthwise through handles 4, provide space to house strut 20. Tension member 22 is housed inside strut 20 which is hollow. When wing nut 28 is applied to threaded end 26 of tension member 22 and tightened, the bucksaw in the folded position becomes a secured, compact package with saw blade 2, strut 20, and tension member 22 all housed within the handles 4. In this preferred embodiment the handles 4 are a lightweight wood, such as poplar, strut 20 is a thin-walled metal tube and tension member 22 is a thin metal rod.

It is apparent that the design may be modified to one in which the handles 4 are rotated inwardly only 90° to achieve the folded condition provided that the hollow for housing the saw blade 2 is moved to the inside edge of handle 4.

Figure 2:
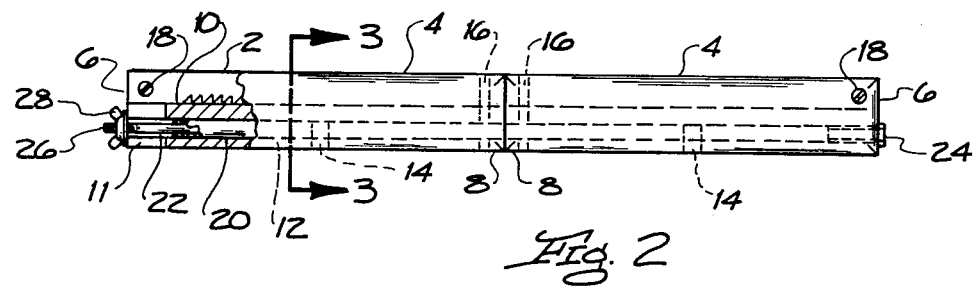
FIG. 2 is a partially cut away elevational view of this invention in its folded condition.
Figure 3:
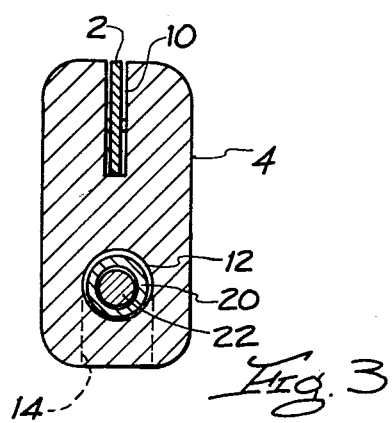
FIG. 3 is a sectional view taken along line 3—3 of FIG. 2.
Figure 4:
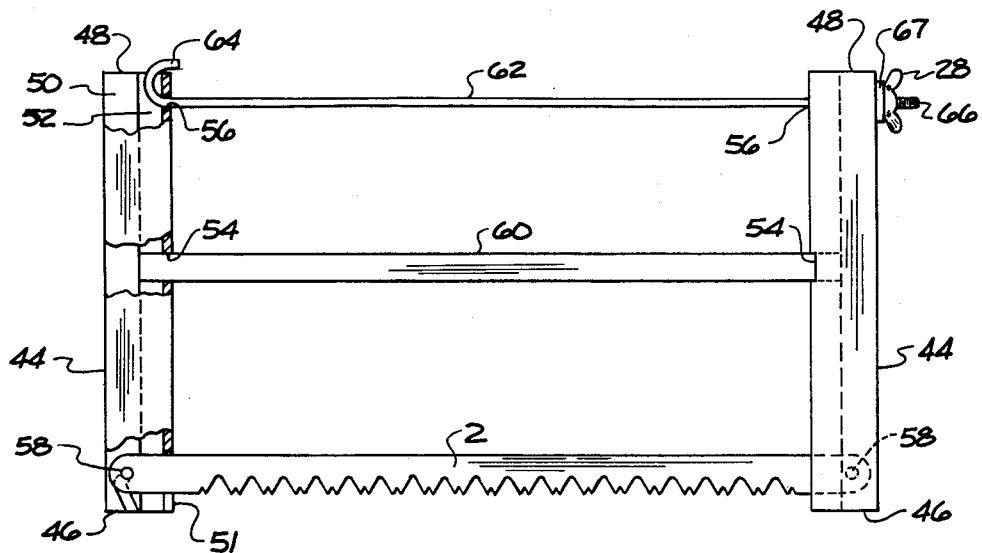
FIG. 4 is a partially cut away elevational view of a modification of this invention in its working condition.
Figure 5:
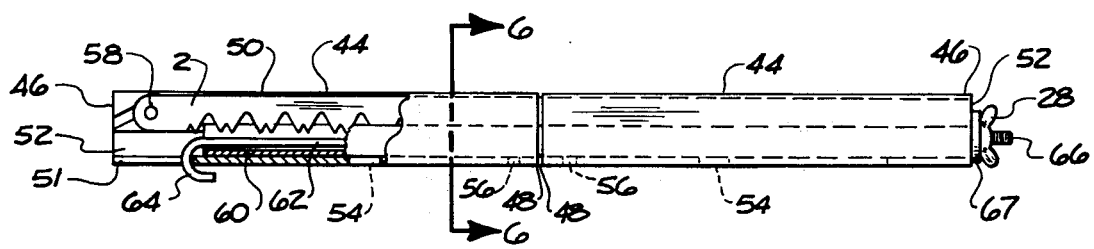
FIG. 5 is a partially cut away elevational view of a modification of this invention in its folded condition.
Figure 6:
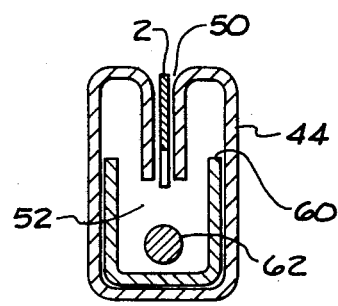
FIG. 6 is a sectional view taken along line 6—6 of FIG. 5.

A modification of the invention is shown in FIG. 4 which shows the bucksaw in its working condition, in which the saw blade 2 is pivotally fastened at each end to lower ends 46 of handles 44 with fasteners 58 to permit saw blade 2 to be tensioned by drawing together the upper ends 48 of handles 44 with tension member 62 while strut 60, located between and parallel to saw blade 2 and tension member 62, spaces the handles 44 apart near their midpoint. End slot 51 in lower end 46 of handles 44 provides space for saw blade 2 while in working condition or while rotating handles 44 from working condition to folded condition or vice versa. A socket 54 for strut 60 is located on the inside edge and near the midpoint of each handle 44. Sockets 54 provide fulcrums for the ends of strut 60. A bore 56 through upper end 48 of each handle 44 provides a means for mounting tension member 62 to handles 44. Tension is applied to tension member 62, thence to saw blade 2, by tightening wing nut 28 onto threaded end 66 of tension member 62, whose other end has hook 64, thus drawing together upper ends 48 of handles 44. Washer 67 provides bearing for wing nut 28. Handles 44 are about one-half as long as saw blade 2 and have a side slot or first hollow 50 along the outside edge of handle 44. When upper ends of handles 44 are disconnected by removing wing nut 28, they can be revolved 270°, first outwardly and then back inwardly under saw blade 2, so that saw blade 2 is housed within first hollow 50 of the handles 44. In the folded position, shown in FIG. 2, handles 44 lie in end-to-end relationship with their upper ends 48 adjacent to each other. Referring to FIGS. 2 and 3, second hollows 52, running lengthwise through handles 44, provide space to house strut 60 and tension member 62. When wing nut 28 is applied to the threaded end 66 of tension member 62 and tightened, the bucksaw in the folded position becomes a secured, compact package with saw blade 2, strut 60 and tension member 62 all housed within the handles 44. In this modification, the handles 44 and strut 60 are formed of light weight alloy sheet metal and the tension member is steel wire. The strut 60 is a channel, but it can be a tube like strut 20 or other shape adapted to withstand axial compression such as a square tube.

Having described the invention with sufficient clarity to enable those familiar with the art to construct and use it, I claim:

1. An improved bucksaw of the type having a saw blade, a strut and a tension member, wherein the improvement comprises:
   a pair of wood handles each being one-half the length of the saw blade and each handle being pivotally connected at its lower end to an end of the saw blade;
   a first hollow running lengthwise along an edge of the handles having a width and depth greater than the saw blade so that when the handles are rotated to the folded condition, the handles house the saw blade; and
   a separate second hollow running lenthwise through the interior of the handles which provides housing for the strut and the tension member when the bucksaw is in the folded condition.

2. An improved bucksaw as set forth in claim 1, in which the first hollow comprises a hollow on the outside edge of the handles so that the handles are rotated 270° to change from the working to the folded condition.

3. An improved bucksaw as set forth in claim 1, in which the tension member is housed within the strut while in the folded condition.

4. A foldable bucksaw comprising:
   a saw blade;
   a pair of wood handles having a first longitudinal hollow along one edge of the handles and a separate second longitudinal hollow running through the interior of the handles, one end of each handle being pivotally attached to each end of the saw blade so that when folded, the handles are in end-to-end relationship parallel to the saw blade, housing the saw blade within the first longitudinal hollow of the handles, and when the handles are unfolded to working position the handles are approximately normal to the saw blade;
   a tension member connecting the ends of the handles more distant from the saw blade when the handles are in working position and housed within the second longitudinal hollow of the handles when the handles are in folded position;
   a strut member parallel to the saw blade and the tension member, centrally located between them, spacing apart the handles when they are in working position, and housed within the second longitudinal hollow of the handles when the handles are in folded position;
   a socket in each of the handles to retain strut member when in working position; and
   means for applying tension to the tension member to complete assembly in the working position and releasing the tension to permit disassembly.

5. A foldable bucksaw as set forth in claim 4 in which the strut member is a round metal tube of an outside diameter that will fit within the separate second longitudinal hollow and an inside diameter that will accommodate the tension member.

* * * * *